Patented Nov. 12, 1929

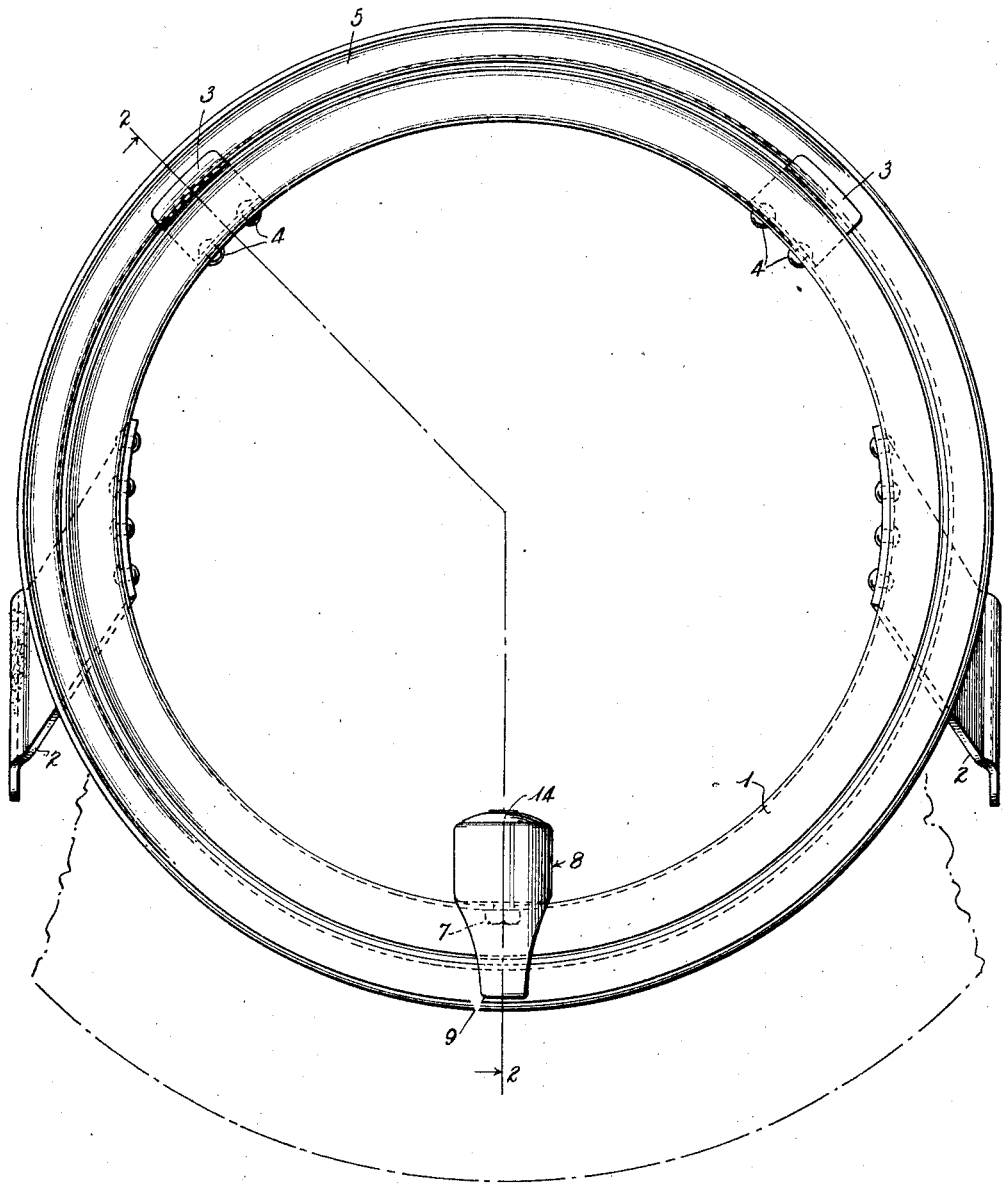

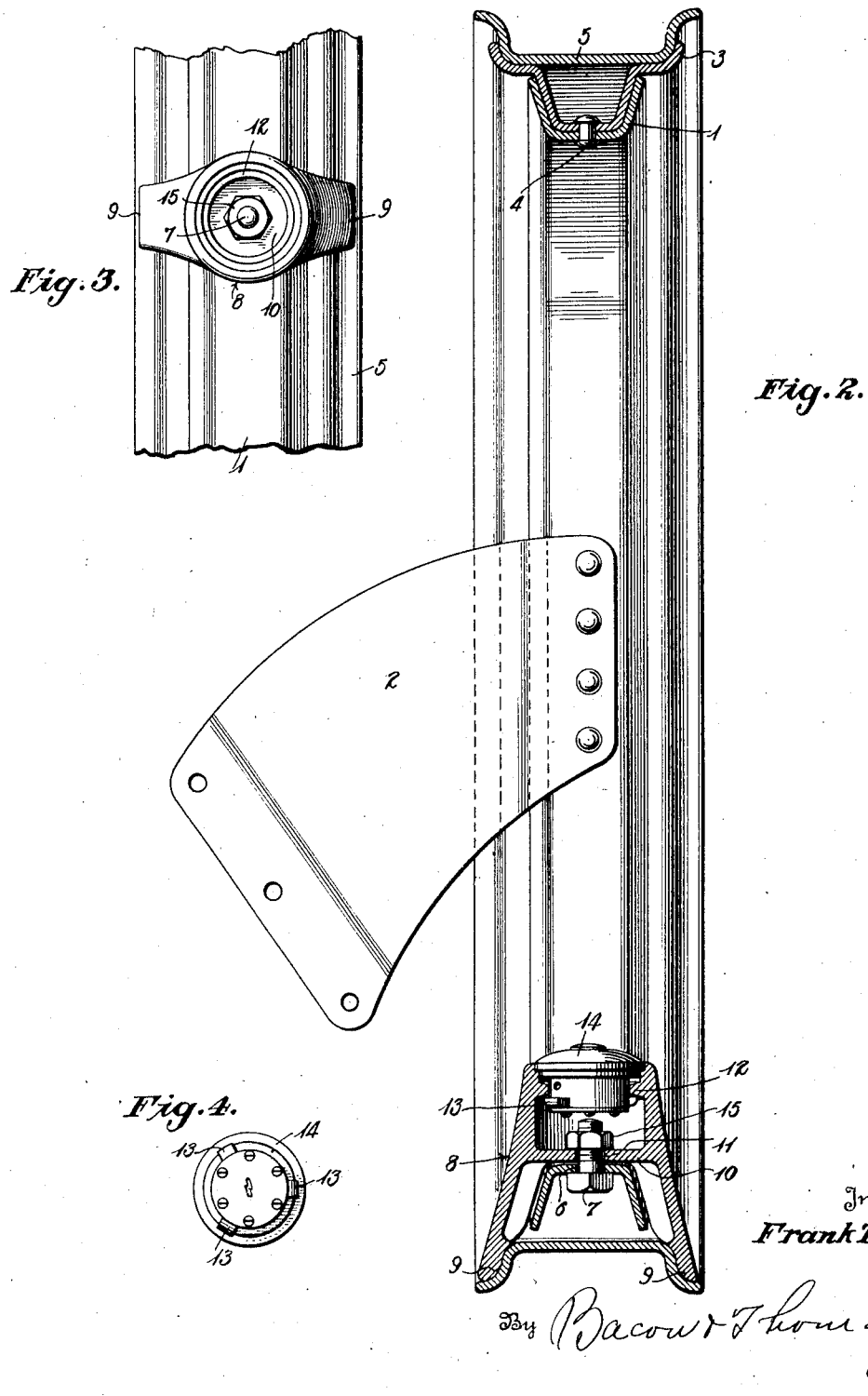

1,735,338

UNITED STATES PATENT OFFICE

FRANK T. ROOT, OF INDIANAPOLIS, INDIANA, ASSIGNOR, BY MESNE ASSIGNMENTS, TO DETROIT AND SECURITY TRUST COMPANY, A CORPORATION OF MICHIGAN

SPARE-RIM AND TIRE LOCKING DEVICE

Application filed February 13, 1926. Serial No. 88,083.

The invention relates to improvements in tire carriers of the type adapted to prevent surreptitious removal of the spare tire and rim.

It is an object of the invention to provide a tire carrier upon which a spare tire and its rim may be readily placed and locked in position, yet at the same time removed by an authorized person with equal ease.

The invention more specifically relates to an improved form of rim clamp and lock therefor used in connection with the tire carrier.

In the drawings Figure 1 discloses a view looking at the rear of the tire carrier; and, Figure 2 is a sectional view through the rim clamp lock.

Fig. 3 is a top view showing the rim clamp without the locking element applied thereto.

Fig. 4 is a detailed view of a locking element per se.

Referring now more particularly to the drawings wherein like reference characters indicate corresponding parts, the numeral 1 designates a tire supporting or carrying ring constructed of metal of U-shaped cross-section. This ring is connected with suitable supports 2 by means of which the rim is supported from the chassis of a vehicle. At the upper portion thereof the ring 1 carries a pair of rim seats 3, each being riveted to the rim by rivets 4. These seats are of a metallic construction and of a contour corresponding to the contour of the under side of the demountable rim 5.

At the lower portion of the ring 1 an aperture 6 passes therethrough. This aperture is adapted to receive a threaded bolt 7. The function of the threaded bolt is to secure the rim clamp 8 against the upper surfaces of the positioned rim 5. The rim clamp has suitable rim engaging sides 9 fitting against each side of the rim 5 at the edges thereof while an intermediate partition 10 is provided having an aperture 11 registering with the aperture 6 in the ring 1. The sides of the rim clamp extend substantially above this partition and are formed with suitable latching detents 12 which engage the under side of shoulders 13 to hold the locking device 14 in position.

It will be appreciated that when a rim is placed on the carrier it seats upon the fixed seats 3 and the rim clamp lock 8 is then clamped down upon the lower portion of the rim as shown in Figure 2. This is accomplished by tightening the nut 15 on the bolt 7 which draws the rim clamp downwardly until it has a locking engagement with the rim. After this has been accomplished the locking device 14 is slipped into the open end of the rim clamp and the detents 13 by reason of their beveled under faces ride over the flange 12 and are then urged out by suitable springs whereby the locking device 14 is locked into position. To remove the locking device 14 and to gain access to the nut 15 of the screw or bolt 7, a locking key is inserted which draws the detents or plungers 13 into the housing of the locking mechanism whereby this locking device can be removed as a unit from the open end of the rim clamp and a spare tire removed, or a tire placed upon the tire carrier.

It will be apparent that when the locking device is in the position described, no unauthorized person can remove a tire from the carrier because it is impossible to move the rim clamp 8 from its locking position with respect to the rim until the nut 11 of the bolt 7 is engaged.

Having thus described my invention, what I claim is:

1. A rim clamp lock for spare wheels, said lock being of substantially U-shaped cross section and having spaced side walls adapted to engage a spare rim, a partition extending laterally across said clamp intermediate the ends of said side walls providing in the clamp an open-ended pocket, a removable lock controlled closure for cooperating with the walls of said pocket to close the open end thereof, an element passing through an opening in said partition for securing said clamp in operative position and having a portion thereof located in the open-ended pocket.

2. A rim clamp adapted to be removably applied as a unit to a tire carrier, said rim clamp having spaced side walls constructed to span the carrier and having portions engageable with the supported rim, and means cooperating with the clamp and carrier respectively for radially adjusting the clamp into operative position with respect to the supported rim, said clamp having an opening rendering said means accessible, and a lock controlled closure attachable to the clamp for closing the opening to prevent unauthorized access to said means.

3. A rim clamp for spare rims of substantially U-shaped cross section and having spaced side walls adapted to engage a spare rim, said side walls being divergingly disposed, a partition extending laterally across said clamp intermediate the ends of the side walls for defining in the clamp a pocket, a fastening element passing through an opening in the partition and accessible through said pocket, and a removable lock controlled closure engageable with the pocket for preventing unauthorized access to the fastening element.

4. A rim clamp for spare tire carriers adapted to be removably applied to the tire carrier, said clamp having side walls constructed to span the carrier and portions engageable with the supported rim, a lateral element within the clamp engageable with the carrier, and a fastening element cooperatively associated with the carrier and partition and adapted upon adjustment to move the clamp radially into operative relationship with respect to the supported rim, and a locking device carried by the clamp for rendering the fastening device inaccessible against unauthorized use.

5. A rim clamp for spare rims supported by tire carriers, comprising side walls constructed to span the carrier and having terminal portions engaging and substantially conforming to the side beads of the supported rim, an adjusting device cooperatively associated with the clamp and carrier respectively, and adapted to move the clamp, as a unit, radially into binding engagement with the supported rim, and a lock controlled device rendering said adjusting means inaccessible against unauthorized use.

In testimony whereof I affix my signature.

FRANK T. ROOT.